United States Patent
Juan

(10) Patent No.: US 8,251,389 B2
(45) Date of Patent: Aug. 28, 2012

(54) BICYCLE WITH AUXILIARY POWER SYSTEM

(75) Inventor: Chih-Chen Juan, Taichung County (TW)

(73) Assignee: Yongmart Manufacturing Co., Ltd., Taichung County (TW)

( * ) Notice: Subject to any disclaimer, the term of this patent is extended or adjusted under 35 U.S.C. 154(b) by 247 days.

(21) Appl. No.: 12/697,552

(22) Filed: Feb. 1, 2010

(65) Prior Publication Data

US 2011/0186372 A1  Aug. 4, 2011

(51) Int. Cl.
*B62M 1/10* (2010.01)
*B62M 6/00* (2010.01)

(52) U.S. Cl. ...... 280/212; 280/215; 280/251; 180/205.1
(58) Field of Classification Search ............... 180/205.1; 280/210, 212, 215, 217, 251, 259, 260, 261
See application file for complete search history.

(56) References Cited

U.S. PATENT DOCUMENTS

| | | | | |
|---|---|---|---|---|
| 1,374,797 A * | 4/1921 | Zaborsky | | 280/215 |
| 2,638,359 A * | 5/1953 | Crumble | | 280/215 |
| 2,908,356 A * | 10/1959 | Daarud | | 185/39 |
| 2,965,393 A * | 12/1960 | Cauchon | | 280/212 |
| 4,108,459 A * | 8/1978 | Alvigini | | 280/215 |
| 4,263,820 A * | 4/1981 | Wetherald | | 74/594.2 |
| 4,416,464 A * | 11/1983 | Mattox | | 280/215 |
| 4,744,577 A * | 5/1988 | Brent et al. | | 280/215 |
| 5,035,678 A * | 7/1991 | Hageman | | 474/50 |
| 6,019,385 A * | 2/2000 | Kelley et al. | | 280/217 |
| 6,035,970 A * | 3/2000 | Conte | | 185/39 |
| 6,053,830 A * | 4/2000 | Glaeser | | 474/101 |
| 6,557,877 B2 * | 5/2003 | Dunkley | | 280/215 |
| 7,240,586 B2 * | 7/2007 | Wu | | 74/594.1 |
| 7,673,893 B2 * | 3/2010 | Jan et al. | | 280/215 |
| 2010/0109280 A1 * | 5/2010 | Wills | | 280/214 |
| 2010/0148465 A1 * | 6/2010 | Coghill, Jr. | | 280/214 |
| 2011/0115188 A1 * | 5/2011 | Jan | | 280/215 |

* cited by examiner

*Primary Examiner* — Lesley Morris
*Assistant Examiner* — Marc Scharich
(74) *Attorney, Agent, or Firm* — Chun-Ming Shih

(57) ABSTRACT

A bicycle is equipped with an auxiliary power system to provide extra power for driving the bicycle forward. The auxiliary power system includes a base fixed to a frame of the bicycle, a power storage device connected to the base, and a ratchet device connecting the power storage device and a main transmission system of the bicycle. When pedals of the bicycle are turned in a forward direction, it may drive the bicycle forward but not the power storage device through the ratchet device. When the pedals are turned in a rearward direction, it may drive the power storage device through the ratchet device to store extra power in the power storage device. A rider may release the power stored in the power storage device to drive the bicycle forward through the ratchet device and the main transmission system.

7 Claims, 9 Drawing Sheets

BICYCLE WITH AUXILIARY POWER SYSTEM

BACKGROUND OF THE INVENTION

1. Field of the Invention

The present invention relates generally to a bicycle, and more particularly to a bicycle with an auxiliary power system to help rider cycling.

2. Description of the Related Art

In early days, bicycles were just an economic vehicle for workers and students, until motorcycles and automobiles gradually replaced bicycles and became the main transportation. Recently, the world has a lack of energy supply, and cycling has an advantage of helping to reduce the production of carbon dioxide. Now bicycles are a popular transportation in many cities.

As a transportation tool to school or work, bicycles should help riders to arrive at the destinations in a faster and easier way. For reaching this goal, bicycles are equipped with a transmission system with which riders may shift to a low gear when riding from a stop point or riding uphill; and shift to a high gear when riding downhill. When bicycle is switched to lower gear, rider exerts the bicycle with less strength but the bicycle goes slowly. On the contrary, when bicycle is switched to high gear, it may speed up the bicycle but rider has to exert the bicycle with greater strength.

Years ago, a power bike, which is equipped with a battery and a motor, was presented in the market. Such bike may function like a normal bike, driven by the rider, but the battery and motor may also take over and drive the bike moving when necessary. Such power bike in the market is huge and heavy because of the battery and motor, and when the battery is out, rider has to exert the bike with much greater strength than an ordinary bike.

SUMMARY OF THE INVENTION

The primary objective of the present invention is to provide a bicycle with an auxiliary power for driving the bicycle moving at specific moments.

According to the objective of the present invention, a bicycle is equipped with an auxiliary power system, which includes a base fixed to a frame of the bicycle, a power storage device connected to the base, and a ratchet device connecting the power storage device and a main transmission system of the bicycle. When pedals of the bicycle are turned in a forward direction, it may drive the bicycle moving forward but not the power storage device through the ratchet device. When the pedals are turned in a rearward direction, it may drive the power storage device through the ratchet device to store power in the power storage device. The power stored in the power storage device can be released by the biker when necessary to drive the bicycle moving forward through the ratchet device and the main transmission system.

DETAILED DESCRIPTION OF THE INVENTION

Figure 1:
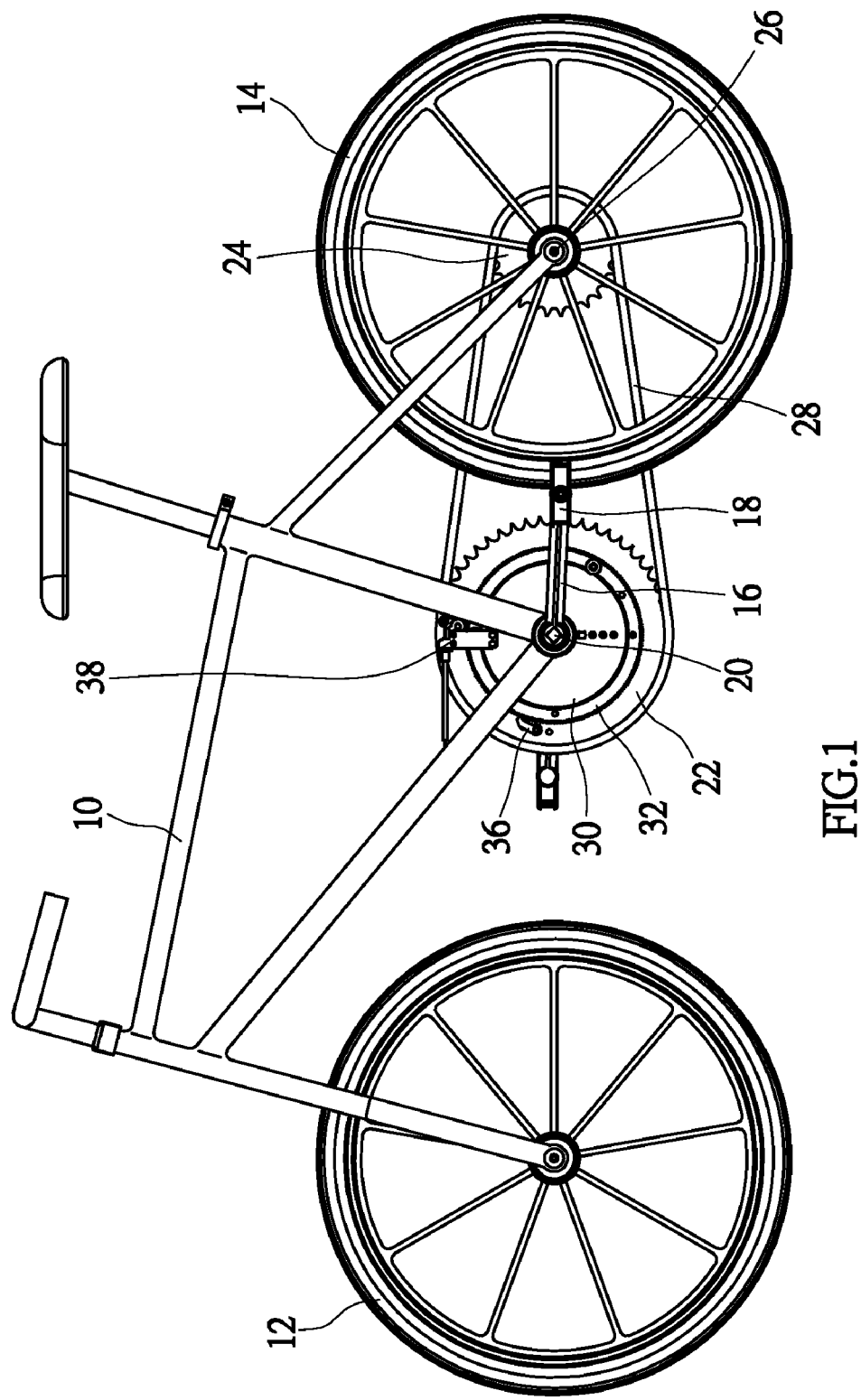
FIG. 1 is a front view of a first preferred embodiment of the present invention.
Figure 2:
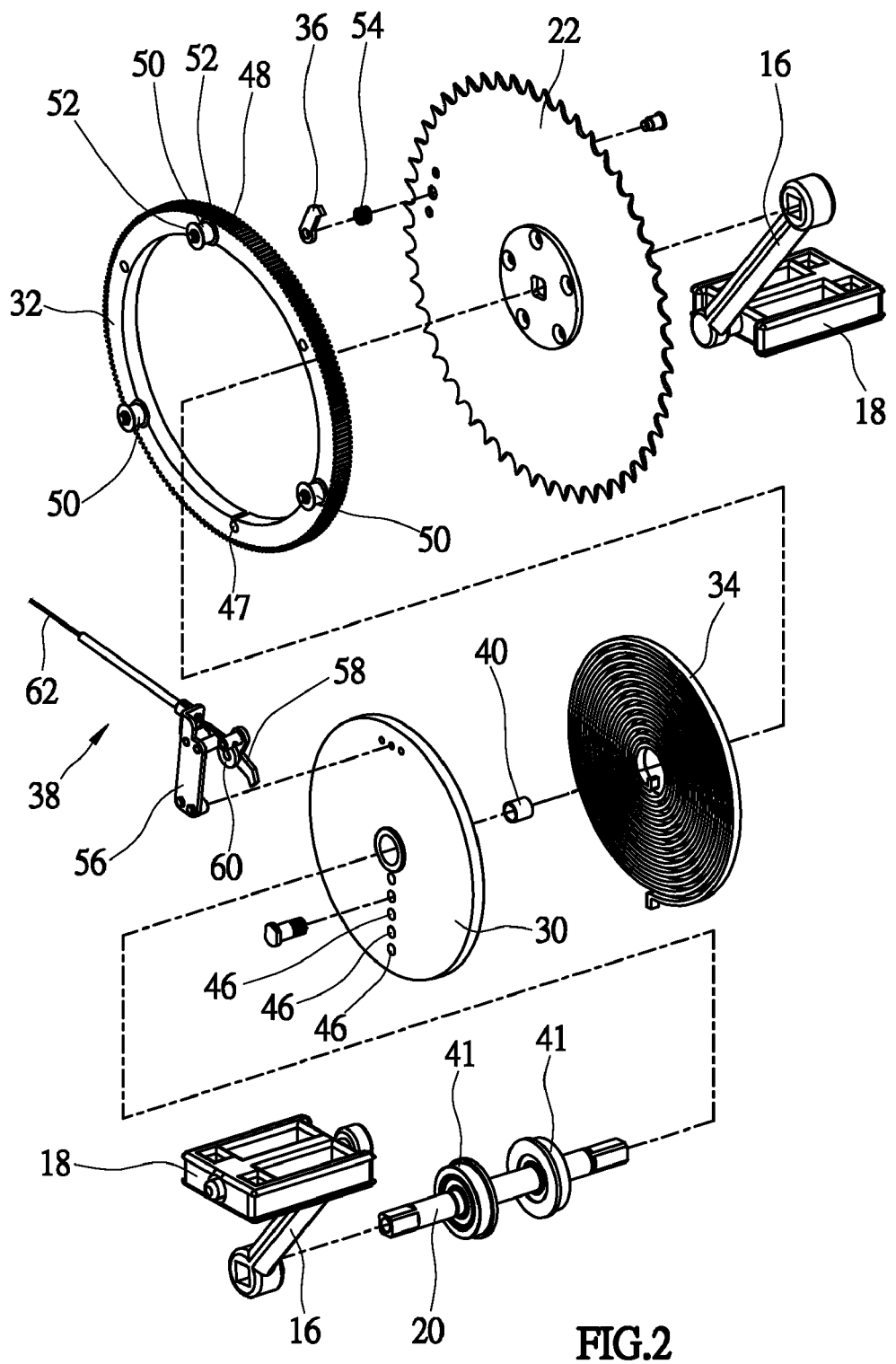
FIG. 2 is an exploded view of the auxiliary power system of the first preferred embodiment of the present invention.
Figure 3:
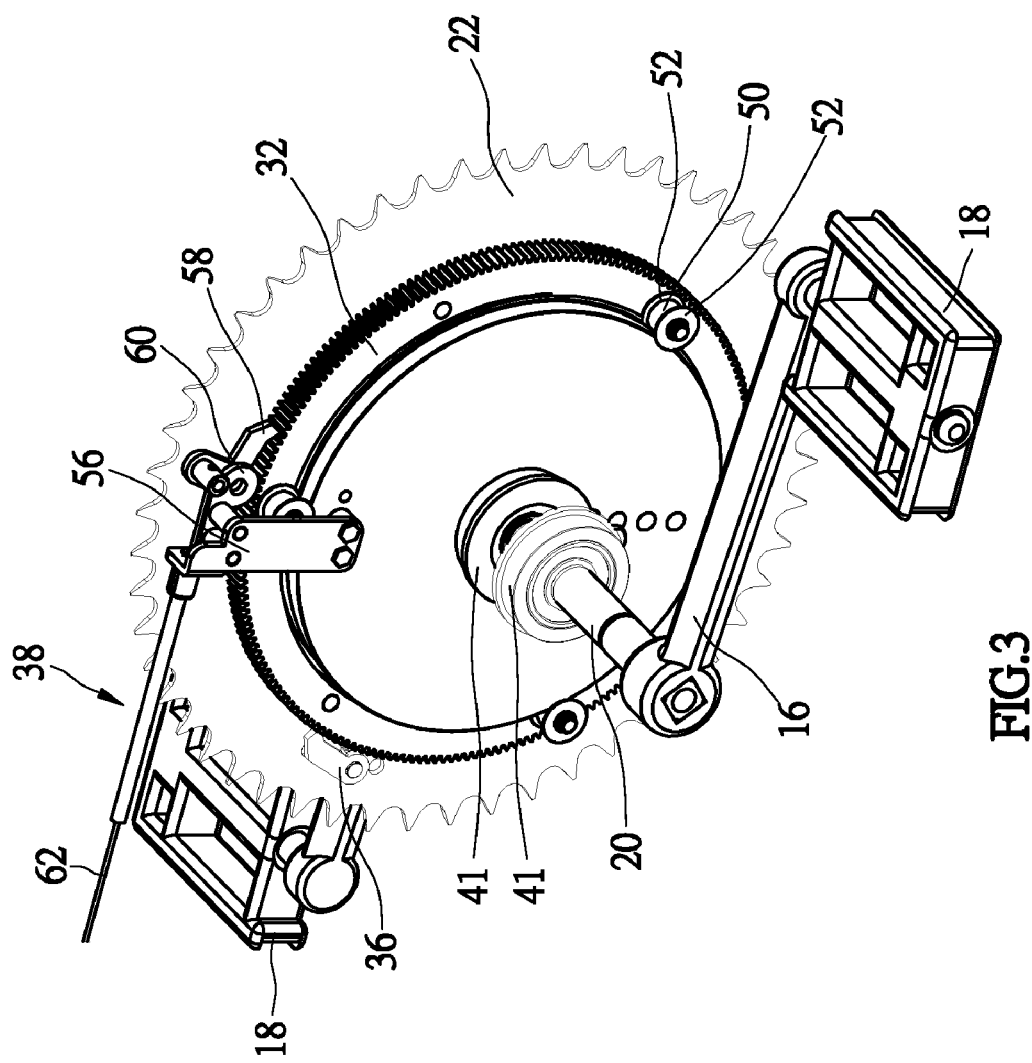
FIG. 3 is a perspective view of the auxiliary power system of the first preferred embodiment of the present invention.
Figure 4:
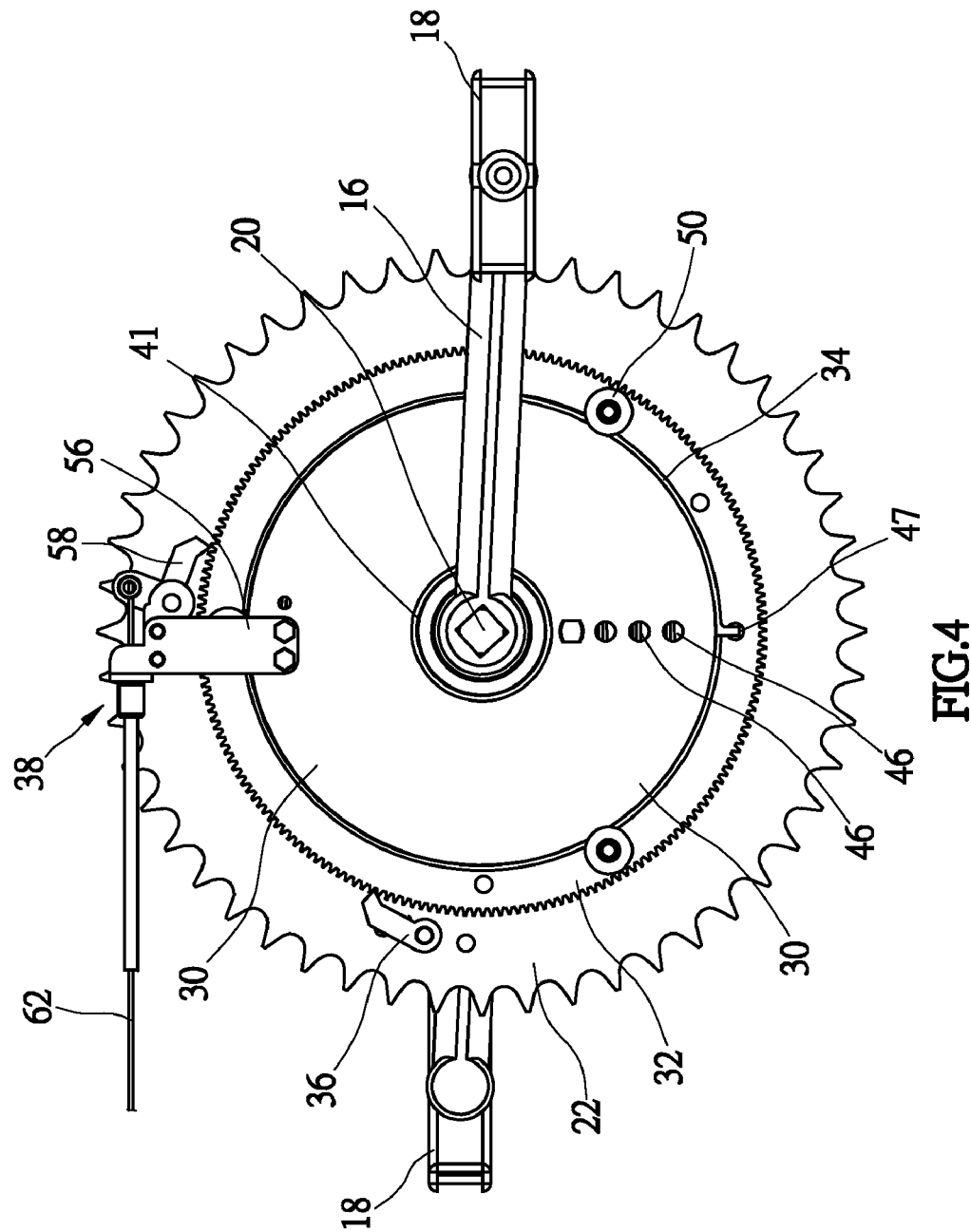
FIG. 4 is a front view of the auxiliary power system of the first preferred embodiment of the present invention.
Figure 5:
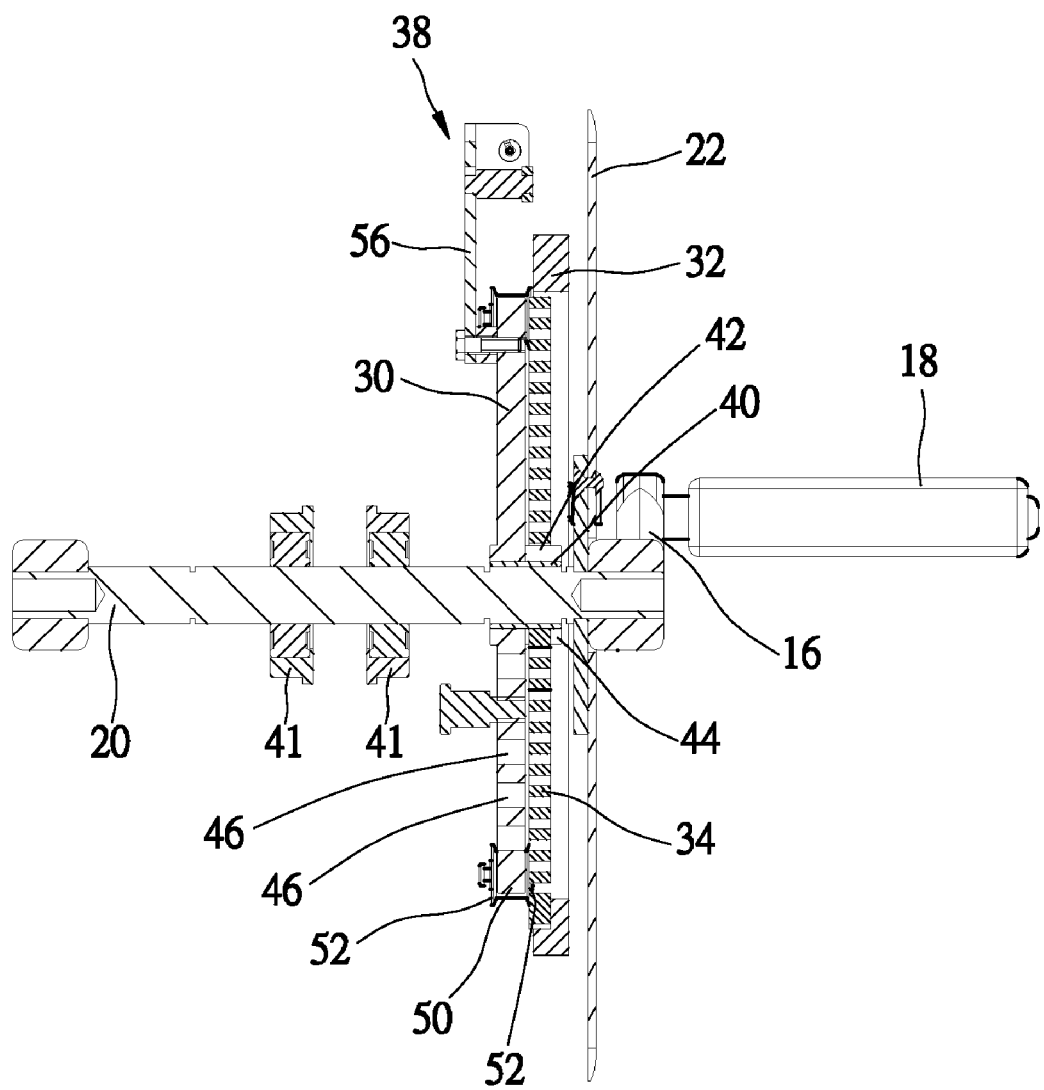
FIG. 5 is a sectional view of the auxiliary power system of the first preferred embodiment of the present invention.

As shown in FIG. 1, the present invention provides a normal bicycle mounted with an auxiliary power system. The bicycle includes a frame 10, two wheels 12, 14 pivotally mounted on the frame 10, and a main transmission system. The main transmission system includes a pair of cranks 16 with pedals 18, a crank axle 20 connecting the cranks 16, a front sprocket 22 connected to the crank axle 20, a rear hub 26 connected to the rear wheel 14, a rear sprocket 24 connected to the rear hub 26, and a chain 28 connecting the front sprocket 22 and the rear sprocket 24. The front sprocket 22 and the rear sprocket 24 may be cassettes, and a derailleur (not shown) may be provided to shift the chain 28. Above elements are the same as a normal bicycle so we do not describe the details here.

Figure 6:
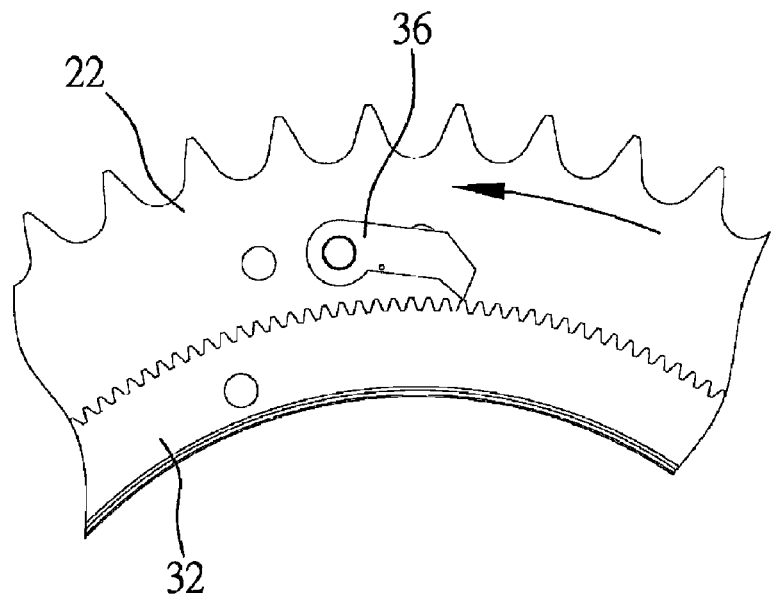
FIG. 6 is a sketch diagram, showing that gear disc is not driven by the pawl when the front sprocket is turned in the forward direction.
Figure 8:
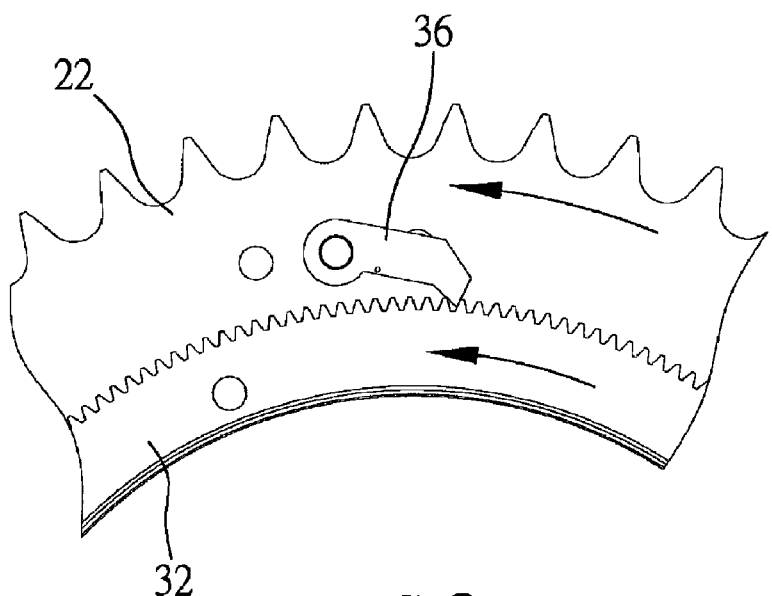
FIG. 8 is a sketch diagram, showing that the front sprocket is driven by the pawl when the gear disc is turned in the forward direction.
Figure 7:
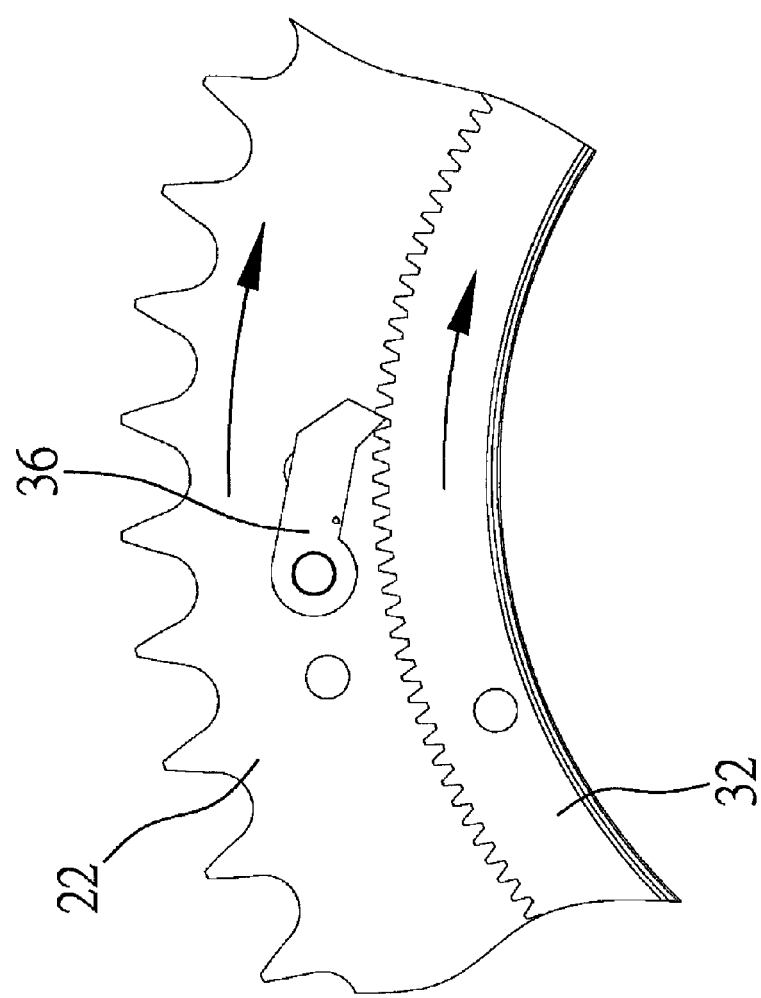
FIG. 7 is a sketch diagram, showing that gear disc is driven by the pawl when the front sprocket is turned in the rearward direction.

In the first preferred embodiment of the present invention, the auxiliary power system is mounted on the crank axle 20 behind the front sprocket 22. As shown in FIG. 2 to FIG. 5, the auxiliary power system includes a base 30, a gear disc 32, a power storage device, shown as a spring 34, a pawl 36, and a release controller 38. The base 30 is a disc fixed to the frame 10. The base 30 has an opening at a center thereof for the crank axle 20 to pass through. A bearing 40, which is a sleeve bearing, is mounted in the opening of the base 30 so that the crank axle 20 is free for rotation relative to the base 30. Bearings 41 are mounted on the crank axle 20 to mount the crank axle 20 on the frame 10. The base 30 has a protrusion 42, which has two gaps 44 thereon. The base 30 is provided with several bores 46 to fix the base 30 on different frames of various bicycles. The gear disc 32 is a ring, which means it has an opening at a center thereof. The gear disc 32 has several recesses 47 on a sidewall of the opening and teeth 48 on a circumference. The gear disc 32 is provided with three rollers 50, each of which has two plates 52 at opposite ends thereof. Diameters of the plates 52 are greater than a diameter of each roller 50 and a distance between the plates 52 is slightly greater than a thickness of the base 30 that the rollers 50 are engaged with a circumference of the base 30 so to connect the gear disc 32 to the base 30 and allow the gear disc 32 to rotate relative to the base 30. The power storage device 34 is a spring with opposite ends inserted into the gap 44 of the base 30 and the recess 47 of the gear disc 32. The pawl 36 is pivoted on the front sprocket 22, and a spring 54 is provided to urge the pawl 36 so that the pawl 36 is normally engaged with the teeth 48 of the gear disc 32. The pawl 36 works as a ratchet device between the front sprocket 22 and the gear disc 32. As shown in FIG. 6, while the front sprocket 22 is turning in a forward direction, which is counterclockwise as shown in FIG. 6, such turning may drive the bicycle forward, but not the gear disc 32. On the contrary, while the front sprocket 22 is turning in a rearward direction, which is clockwise shown in FIG. 7, the gear disc 32 is driven by the front sprocket 22. While the gear disc 32 is driven by the power storage device 34 for rotation in the forward direction, which is counterclockwise as shown in FIG. 8, the front sprocket 22 will also be driven for rotation in the forward direction, thus aiding to drive the bicycle forward. The release controller 38 has a frame 56 fixed to the base 30, a pawl 58 pivoted on the frame 56, a spring 60 urging the pawl 58 and making it normally engaged with the teeth 48 of the gear disc 32, and a cord 62 with an end connected to the pawl 58 and the other end connected to a controller (not shown). A rider may operate the controller to cause the release controller 38 to disengage the pawl 58 from the teeth 48 or the gear disc 32. While the pawl 58 is engaged with the gear disc 32, the gear disc 32 is restricted to rotation only in the rearward direction, thus making rotation of the gear disc 32 in the forward direction impossible. A thickness of the pawl 58 is about half of a thickness of the gear disc 32, similar to the pawl 36, so that both of the pawls 36 and 58 may be engaged with the teeth 48 of the gear disc 32 without interference with each other.

When a rider rides the bicycle of the present invention and propels the pedals 18 in a forward rotation, the bicycle of the present invention, like a normal bicycle, will drive forward, and the gear disc 32 will not be driven because of the pawl 36 configuration. When the rider propels the pedals 18 in a rearward rotation, the front sprocket 22 is turned in the rearward direction to drive the gear disc 32 to rotate in the rearward direction via the pawl 36, which will wind up the spring (energy storing device) 34. After that, the pawl 58 of the release controller 38 will engage with the gear disc 32 to prevent the gear disc 32 from rotating in the forward direction once the rider stops propelling the pedals 18 rearwardly and/or begins to propel the pedals 18 forwardly, and when the pawl 58 is disengaged from the gear disc 32, the spring 34 will turn the gear disc 32 in the forward direction so that the gear disc 32 may drive the front sprocket 22 via the pawl 36 to provide extra auxiliary power for driving the bicycle forward. After the power stored in the spring 34 is run out, the rider may propel the pedals 18 reversely (in the rearward rotation) again to store power in the spring 34 and release it by rider's control when necessary.

In cycling, the rider has no need to propel the bicycle when riding downhill or in high speed. On the contrary, the rider has to propel with more strength when cycling uphill or from a stop point. In riding the bicycle of the present invention, the rider may propel the pedals reversely to store energy in the auxiliary power system, and then, the rider may release it by operating the release controller when cycling uphill or from a stop point to give the bicycle extra power for moving forward. The auxiliary power system of the present invention gives extra power that may help the rider to ride the bicycle more easily. The auxiliary power system of the present invention may be mounted on any kind of bicycles. In practice, the rider may just take the original crank set off, and mount the auxiliary power system of the present invention that the auxiliary power system may work in the bicycle.

Figure 9:
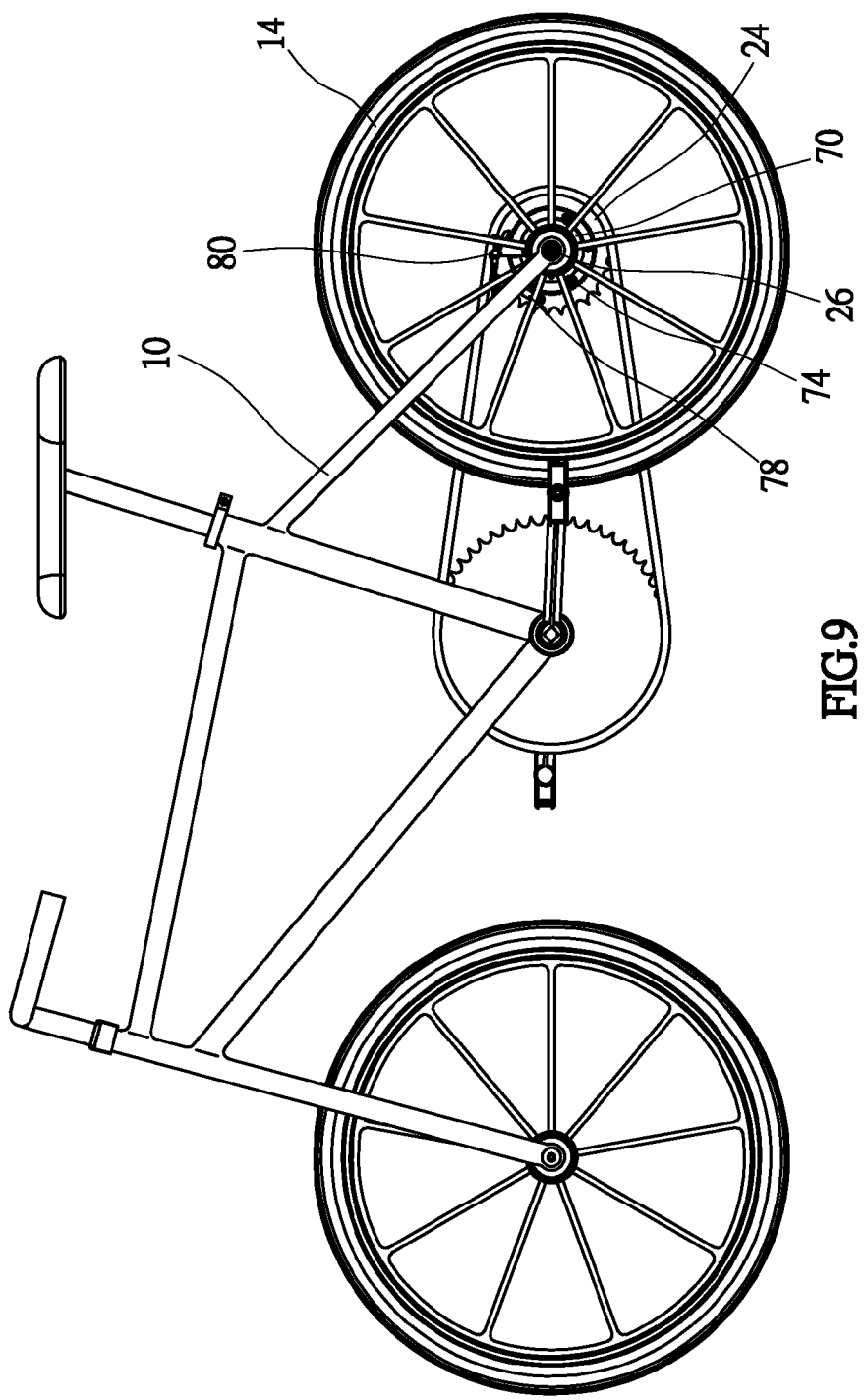
FIG. 9 is a front view of a second preferred embodiment of the present invention.
Figure 10:
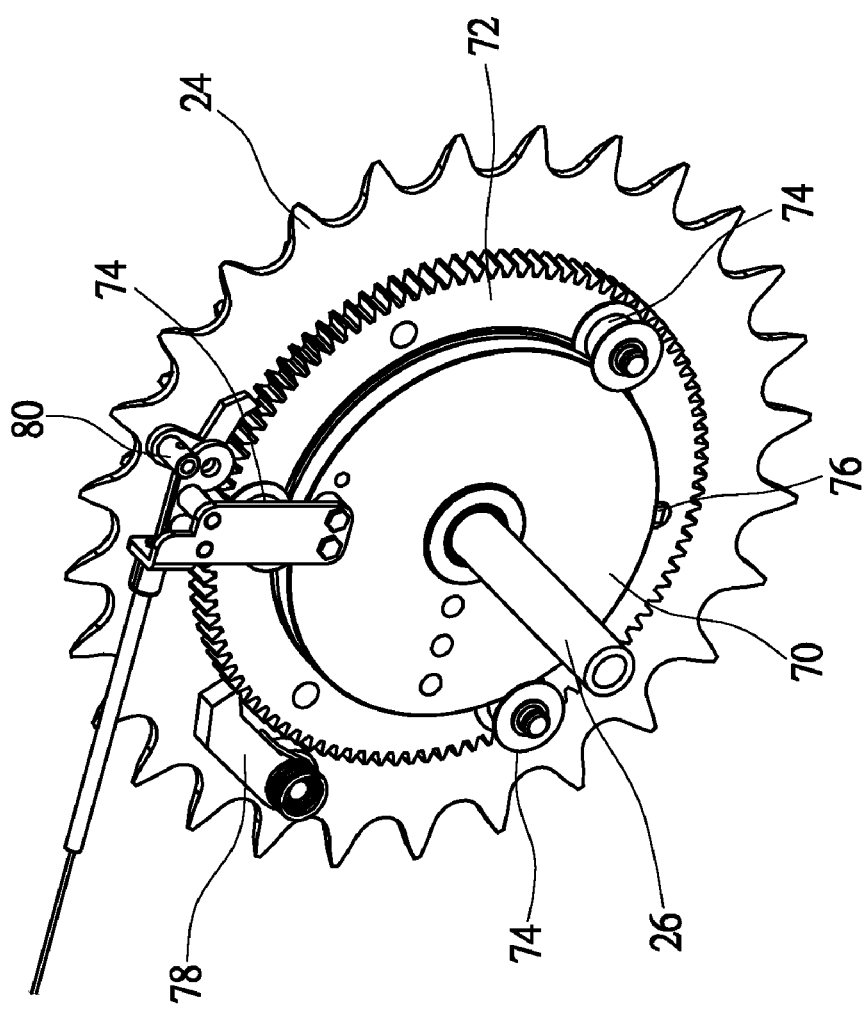
FIG. 10 is a perspective view of the auxiliary power system of the second preferred embodiment of the present invention.

FIG. 9 and FIG. 10 show a second preferred embodiment of the present invention, in which an auxiliary power system is mounted on the rear hub 26. The auxiliary power system mounted on the rear hub 26 has the same structure as the first preferred embodiment, including a base 70 fixed to a rear fork of the frame 10 behind the rear sprocket 24, a gear disc 72 is pivotally mounted on the base 70 via several rollers 74, a spring 76 with opposite ends connected to the base 70 and the gear disc 72, a pawl 78 mounted on an inner side of the rear sprocket 24, normally engaged with the gear disc 72, and a release controller 80 mounted on the base 70, normally engaged with the gear disc 72.

The function and operation of the auxiliary power system mounted on the rear hub 26 are the same as the auxiliary power system mounted on the crank axle 20. When the rider propels the pedals 18 for driving the bicycle forward, it will drive the rear wheel 14 turning through the front sprocket 22, chain 28, and the rear sprocket 24, the same as a normal bicycle. When the rider propels the pedals 18 reversely, it will turn the rear sprocket 24 reversely to drive the gear disc 72 reversely turning through the pawl 78 that the spring 76 is wound up to store power. When the rider operates the release controller to disengage a pawl with the gear disc 72, the spring may drive the rear sprocket 24 turning via the pawl 78 to give the bicycle extra power for moving forward.

What is claimed is:

1. A bicycle comprising a frame, a front wheel and a rear wheel rotatably mounted on the frame, a main transmission system including a crank axle rotatably mounted on the frame, two cranks mounted on opposite ends of the crank axle, two pedals mounted on the cranks, a front sprocket connected to the crank axle, a rear hub connected to the rear wheel, a rear sprocket connected to the rear hub, and a chain connecting the front sprocket and the rear sprocket, and an auxiliary power system, wherein the auxiliary power system includes:

a base in the form of a disc fixedly mounted on the frame and adjacent to the front sprocket or the rear sprocket;
 an energy storage device connected to the base, and
 a ratchet device mounted on the front sprocket or the rear sprocket for connecting the energy storage device and the main transmission system;
 wherein when the cranks are turned in a rearward direction, the energy storage device is operable to store energy via the ratchet device, but when the cranks are turned in a forward direction and additional auxiliary assistance is desired, the energy storage device is operable to release the stored energy via the ratchet device to drive the rear wheel,
 wherein the auxiliary power system further includes a gear disc rotatably mounted on the base and connected to the power storage device, the gear disc having teeth at a circumference thereof, and the ratchet device having a first pawl connected to the front sprocket or the rear sprocket and a first spring urging the first pawl, which biases the first pawl to engage with the teeth of the gear disc in a normal state when no stored energy is being released, and
 wherein the power storage device is an energy storing spring received in an opening of the gear disc, the energy storing spring connected to the gear disc and the base respectively to be wound up by a rotation of the gear disc in the rearward direction.

2. The bicycle as defined in claim 1, wherein the base has an opening fitted to the crank axle, and a bearing located in the opening is mounted between the base and the crank axle.

3. The bicycle as defined in claim 1, wherein the gear disc has a recess on a sidewall of the opening, and the base has a protrusion with a gap thereon, and the energy storing spring has opposite ends engaged with the recess of the gear disc and the gap of the base respectively.

4. The bicycle as defined in claim 1, wherein the gear disc is provided with rollers, each of which has two plates on opposite ends of the roller, and diameters of the plates are greater than a diameter of the roller so that the rollers are engaged with a circumference of the base.

5. The bicycle as defined in claim 1, wherein the base has an opening fitted to the rear hub, and a bearing located in the opening is mounted between the base and the rear hub.

6. The bicycle as defined in claim 1, wherein the auxiliary power system further includes a release controller for manipulation to release the energy stored in the energy storage device.

7. The bicycle as defined in claim 6, wherein the release controller includes a release controller frame fixed to the base, a second pawl pivoted on the release controller frame, a second spring urging the second pawl, which biases the second pawl to engage with the teeth of the gear disc in the normal state, and a cord connected to the second pawl to draw the second pawl to be disengaged from the gear disc.

* * * * *